(12) United States Patent
Young et al.

(10) Patent No.: US 12,377,779 B2
(45) Date of Patent: Aug. 5, 2025

(54) VEHICLE LAMP ASSEMBLY

(71) Applicant: NISSAN NORTH AMERICA, INC., Franklin, TN (US)

(72) Inventors: Steven Young, Ypsilanti, MI (US); Nelson Phan, Rochester Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 18/447,281

(22) Filed: Aug. 9, 2023

(65) Prior Publication Data
US 2025/0050805 A1    Feb. 13, 2025

(51) Int. Cl.
*B60Q 3/54* (2017.01)
*B60Q 3/64* (2017.01)
*B60Q 3/76* (2017.01)

(52) U.S. Cl.
CPC ............... *B60Q 3/54* (2017.02); *B60Q 3/64* (2017.02); *B60Q 3/76* (2017.02)

(58) Field of Classification Search
CPC .................................... B60Q 3/64; B60Q 3/54
See application file for complete search history.

(56) References Cited

U.S. PATENT DOCUMENTS

| | | | | |
|---|---|---|---|---|
| 7,419,285 | B2 * | 9/2008 | Kamiya | B60Q 3/14 362/545 |
| 7,815,339 | B2 * | 10/2010 | Veenstra | F21S 43/195 362/249.02 |
| 7,862,220 | B2 * | 1/2011 | Cannon | B60Q 3/74 362/605 |
| 8,720,939 | B2 * | 5/2014 | Schmitz | B60R 21/215 296/146.7 |
| 10,232,770 | B2 * | 3/2019 | LeCompte | B60N 2/00 |
| 2006/0198155 | A1 * | 9/2006 | Nickola | B60Q 3/217 362/488 |
| 2008/0198607 | A1 * | 8/2008 | Goto | B60Q 3/51 362/362 |
| 2009/0129100 | A1 * | 5/2009 | Goto | B60Q 3/51 362/311.01 |

* cited by examiner

*Primary Examiner* — Matthew J. Peerce
(74) *Attorney, Agent, or Firm* — Global IP Counselors, LLP (57) ABSTRACT

A vehicle lamp assembly includes a lamp housing, a trim panel and a bezel. The lamp housing includes a lens, a light source and first attachment structures. The trim panel defines a first lens receiving opening. The bezel has a second lens receiving opening and second attachment structures. The lamp housing attaches to the bezel with the lamp housing overlaying a portion of the trim panel on an opposite side from the bezel. The lens of the lamp housing extends through the first lens receiving opening and the second lens receiving opening with the first attachment structures and the second attachment structures attached to one another.

15 Claims, 7 Drawing Sheets

VEHICLE LAMP ASSEMBLY

BACKGROUND

Technical Field

The present disclosure generally relates to a vehicle lamp assembly. More specifically, the present disclosure relates to vehicle lamp assembly that is easily installed to a footwell area of a passenger compartment.

Background Information

Vehicle passenger compartments are provided with a predetermined amount of lighting fixtures. Regardless, there are often areas of the passenger compartment of a vehicle that lack sufficient lighting.

SUMMARY

One object of the present disclosure is to provide a simple and easily installable lighting or lamp assembly for a footwell area of a passenger compartment of a vehicle.

In view of the state of the known technology, one aspect of the present disclosure is to provide a vehicle lamp assembly with a lamp housing, a trim panel and a bezel. The lamp housing includes a lens and a light source behind the lens. The housing has first attachment structures adjacent to the lens. The trim panel has a first surface and a second surface opposite the first surface. The trim panel also defining a first lens receiving opening that extends from the first surface to the second surface. The bezel has a second lens receiving opening and second attachment structures adjacent to the second lens receiving opening such that with the lamp housing attached to the bezel the lamp housing overlays a portion of a first surface of the trim panel surrounding the first lens receiving opening. The bezel overlays a portion of the second surface surrounding the second lens receiving opening, the lens of the lamp housing extends through the first lens receiving opening and the second lens receiving opening. The first attachment structures and the second attachment structures are engaged with one another attaching the bezel to the lamp housing with the trim panel sandwiched therebetween.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
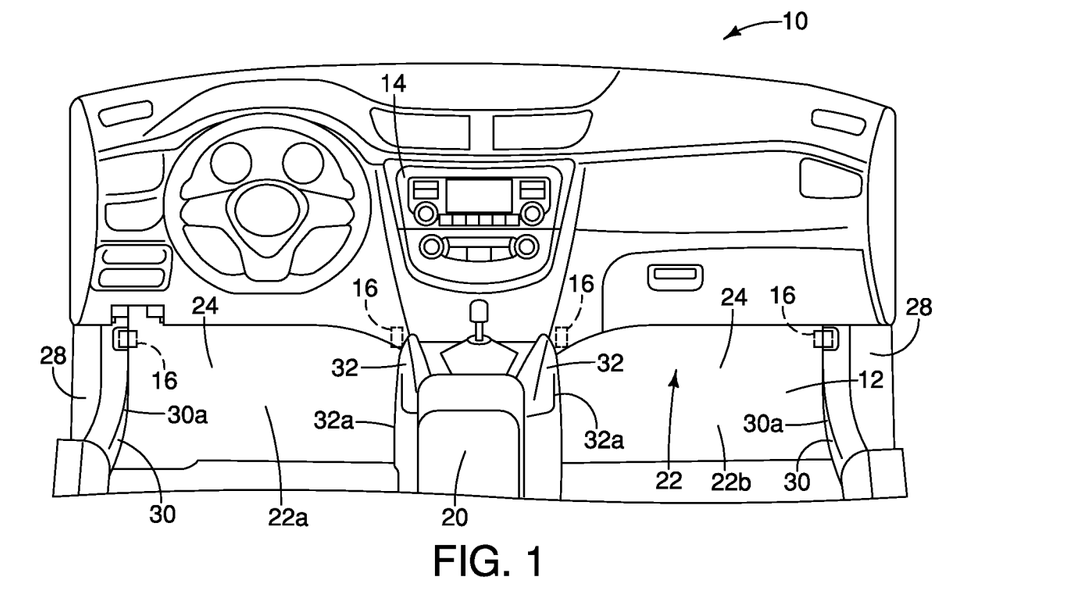
FIG. 1 is a view of a portion of a passenger compartment of a vehicle showing an instrument panel and further showing trim panels covering forward portions of a center console and trim panels covering lower portions of A-pillar structures within a footwell area of the passenger compartment and further showing lamp structures installed to the trim panels at partially concealed of the footwell area in order to illuminate the footwell area in accordance with a first embodiment.

Referring initially to FIG. 1, a vehicle 10 having a passenger compartment 12 with an instrument panel 14 is illustrated in accordance with a first embodiment. The passenger compartment 12 is illuminated by a vehicle lamp assembly 16 installed beneath the instrument panel 14, as described in greater detail below.

The passenger compartment 12 includes a floor 18, a center console 20 that divides a footwell area 22 below the instrument panel 14 into two footwalls 22a and 22b. In the footwell area 22a a driver's feet can be located and in the other footwell 22b, a passenger's feet can be located. The footwells 22a and 22b are confined at their forward ends by a dashwall 24. Outboard sides of the footwells 22a and 22b extend to A-pillar structures 28. Inboard sides of the footwells 22a and 22b extend to the center console 20.

Figure 2:
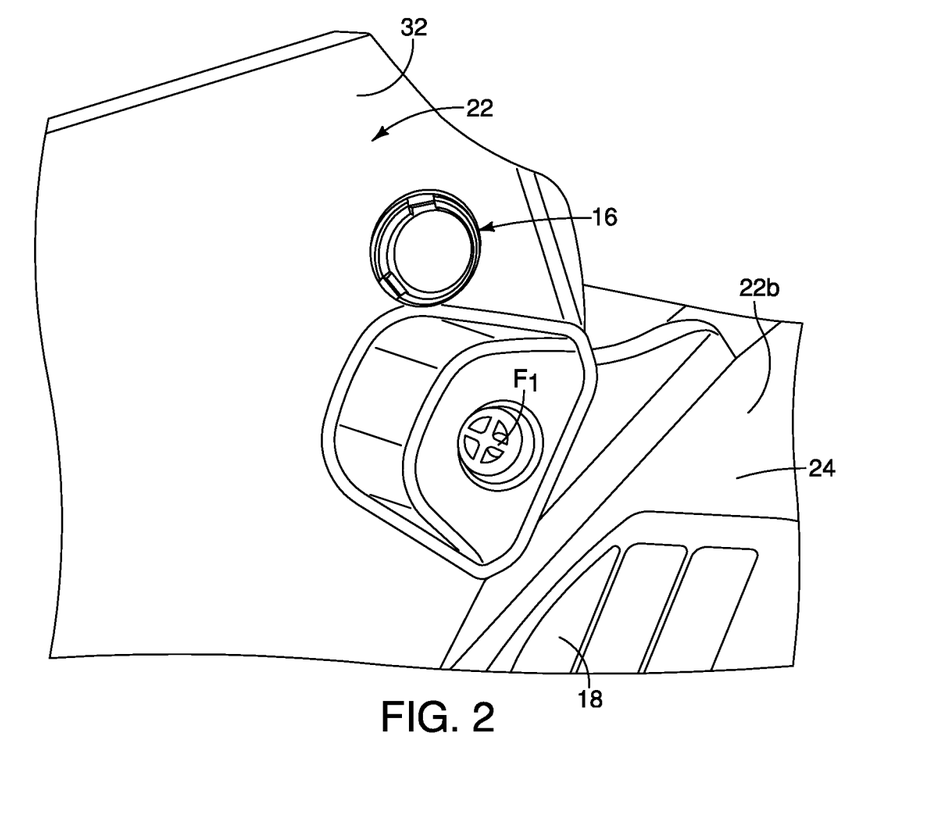
FIG. 2 is a perspective view of one of the trim panels covering a forward area of the center console and showing one of the lamp assemblies installed to a predetermined part of the trim panel in order to illuminate the adjacent footwell area of the passenger compartment in accordance with the first embodiment.
Figure 3:
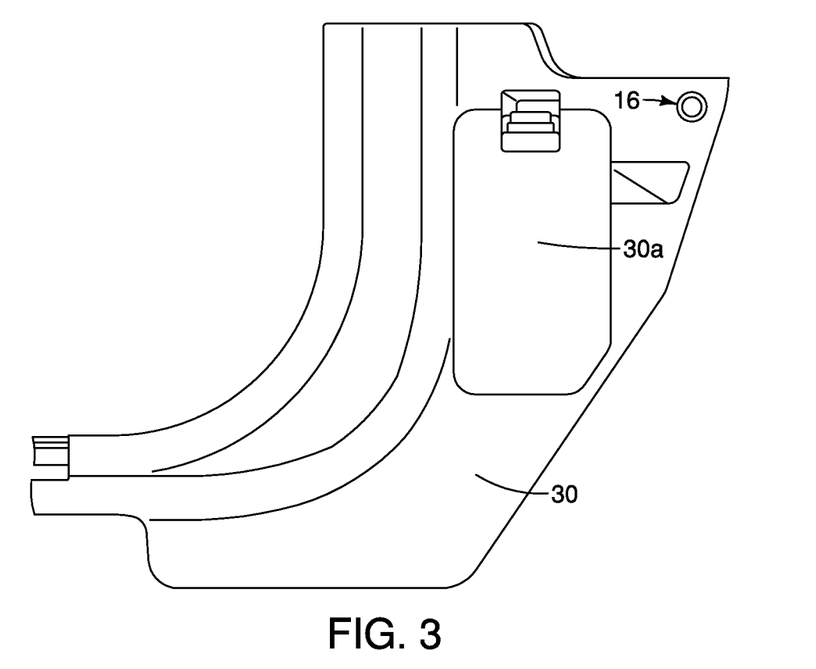
FIG. 3 is a side view of one of the trim panels that covers the A-pillar structure at a driver's side of the vehicle with one of the lamp assemblies installed to a predetermined part of the trim panel in order to illuminate the adjacent footwell area of the passenger compartment in accordance with the first embodiment.
Figure 4:
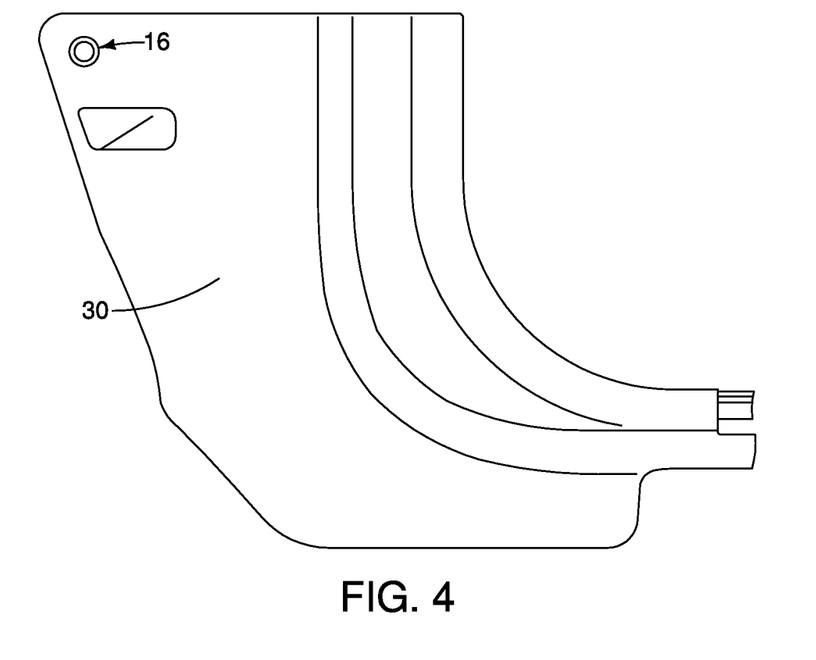
FIG. 4 is a side view of the other of the trim panels that covers the A-pillar structure at a passenger's side of the vehicle with one of the lamp assemblies installed to a predetermined part of the trim panel in order to illuminate the adjacent footwell area in accordance with the first embodiment.

Trim panels 30 cover and conceal the A-pillar structures 28. Trim panels 32 (panels 32a and 32b) cover the sides of the center console 20 and are fixed in position by fasteners $F_1$, as shown in FIG. 2. The trim panels 30 and 32 cover structures that are located alongside the footwell areas 22 (area 22a and 22b) of the passenger compartment 12 of the vehicle 10 and are also located adjacent to the dashwall 24 of the passenger compartment 12. The trim panels 30 can include an access door 30a, as shown in FIG. 3. The access door 30a can conceal, for example, a fuse panel (not shown) or other vehicle component.

Figure 5:
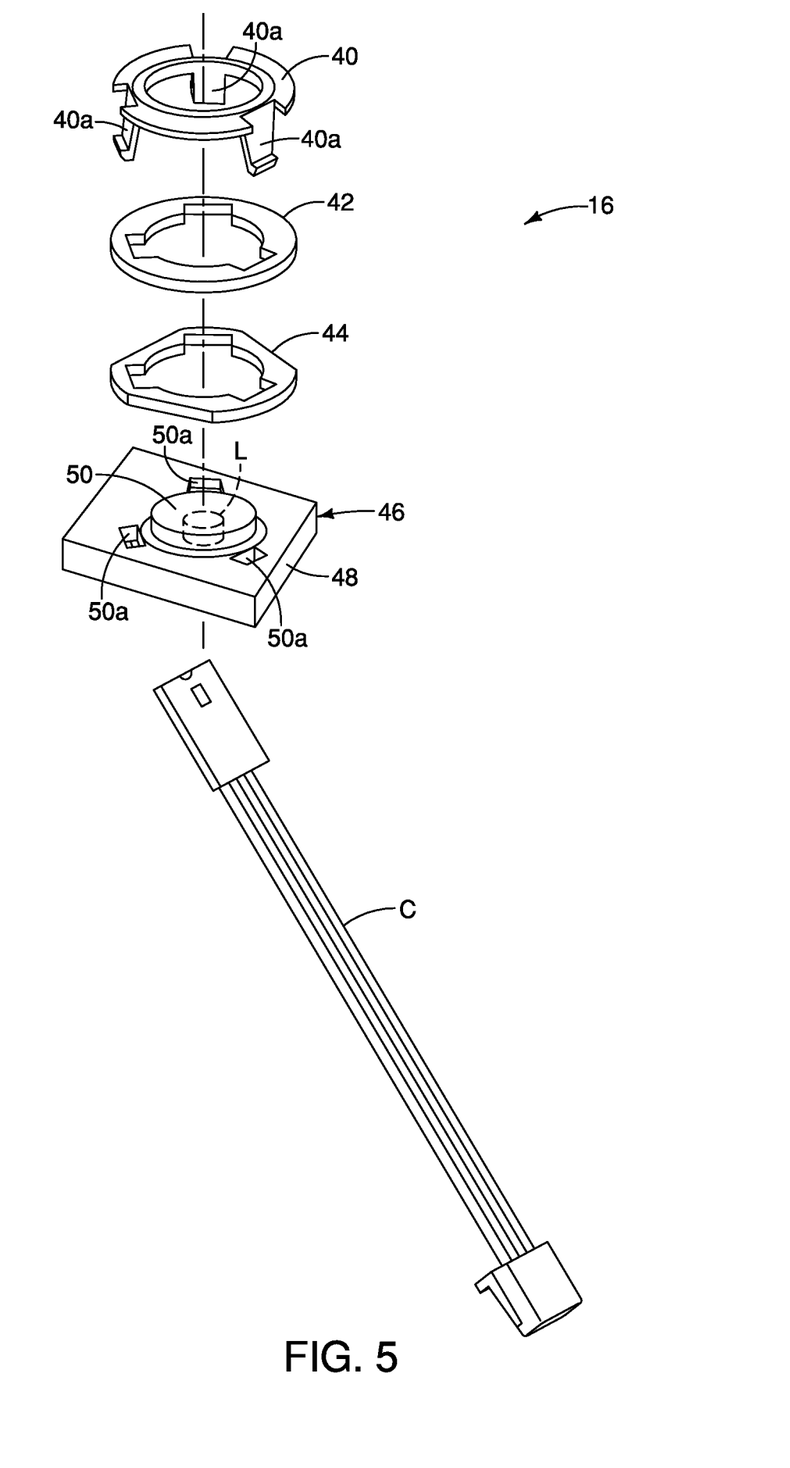
FIG. 5 is an exploded view of the various elements of the lamp assembly showing a bezel, a bezel gasket, a footwell gasket, a lens assembly and a cable in accordance with the first embodiment.
Figure 6:
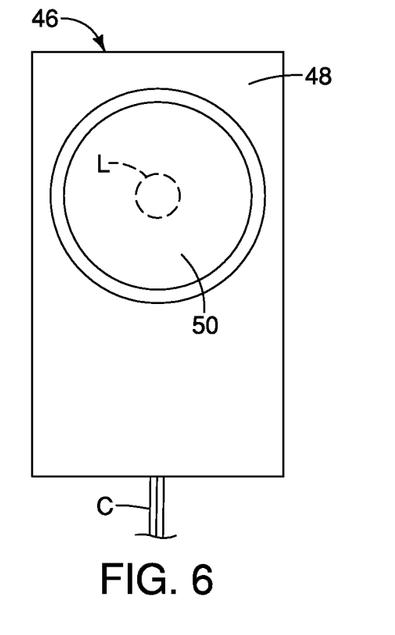
FIG. 6 is a front view of the lens assembly shown removed from the vehicle showing the lens, the light source (in phantom) and the cable in accordance with the first embodiment.

A description is now provided of the vehicle lamp assembly 16 (hereinafter the lamp assembly 16) with reference to FIGS. 5-8. As shown in FIG. 5, the lamp assembly 16 includes a bezel 40, a bezel gasket 42, a footwell gasket 44, a lens assembly 46 with a housing 48, a light source L and a lens 50, and cable C.

The bezel 40 has a ring-shaped body with a lens receiving opening that is dimensioned to receive the lens 50 of the lens assembly 46. The bezel 40 further includes a plurality of snap-fitting protrusions 40*a*. In the depicted embodiment, there are three snap-fitting protrusions 40*a*. The snap-fitting protrusions 40*a* are also referred to herein below as second attachment structures. The bezel 40 has an overall circular shape.

The bezel 40 includes an opaque cover (not shown that at least partially covers the lens 50 and more preferably completely covers the lens 50.

The bezel gasket 42 is a compressible ring that fits against an exposed side of one of the trim panels 30 and 32, depending on which one of the trim panels 30 or 32 the lamp assembly 16 is installed to. Similarly, the footwell gasket 44 is a compressible ring that fits against a hidden side of one of the trim panels 30 and 32, depending on which one of the trim panels 30 or 32 the lamp assembly 16 is installed.

As shown in FIGS. 5-8, the lens assembly 46 includes the housing 48, the light source L and the lens 50. The light source L is preferably an LED (light emitting diode) or other low voltage light source. The lens 50 of the lamp housing 46 is circular shaped and is mounted to the housing such that light from the light source L shines through the lens 50. The lamp housing 46 also includes the light source L installed within the housing 46 and behind the lens 50. The housing 48 includes a plurality of attachment structures 50*a* adjacent to the lens 50. The attachment structures 50*a* (also referred to as first attachment structures 50*a*) are stop surfaces that are dimensioned and shaped to receive the plurality of snap-fitting protrusions 40*a*. In the depicted embodiment, there are three snap-fitting protrusions 40*a* and three attachment structures 50*a*. However, it should be understood from the drawings and the description that there can be fewer or more than three of each of the snap-fitting structures 40*a* and the attachment structures 50*a*.

The main body of the lamp housing 48 has an overall rectangular shape with the lens 50 extending therefrom. The lens 50 and its retaining structure define an overall cylindrical protrusion that extends therefrom with the lens 50 supported by the cylindrical protrusion such that the lens 50 is spaced apart from the main body of the lamp housing 48.

When the lamp assembly 16 is installed to one of the panels 30 and 32, the lens 50 is fitted through a central opening (a lens receiving opening) in the footwell gasket 44 and then through an opening in the corresponding one of the panels 30 and 32. Next the bezel 40 and the bezel gasket 42 are installed to the lens 50 with the snap-fitting protrusions 40*a* extending through the opening in the one of the panels 30 or 32 with each of the snap-fitting protrusions 40*a* extending through corresponding ones of the attachment structures 50*a* of the lens assembly 46, as shown in FIG. 7.

With the lamp housing 48 attached to the bezel 40, the bezel 40 of the lamp housing 16 and the footwell gasket 44 overlay a portion of the exposed surface (a first surface) of the trim panel 30 or 32 that surrounds the first lens receiving opening in the trim panel 30 or 32. The bezel 40 and bezel gasket 42 overlay a portion of the second surface surrounding the first lens receiving opening in the trim panel 30 of 32. The lens 50 of the lamp housing 48 extends through the first lens receiving opening of the trim panel 30 or 32 and the second lens receiving opening in the bezel gasket 42. The first attachment structures 50*a* and the second attachment structures (the snap-fitting protrusions 40*a*) are engaged with one another attaching the bezel 40 to the lamp housing 48 with the trim panel 30 or 32 sandwiched therebetween.

Figure 7:
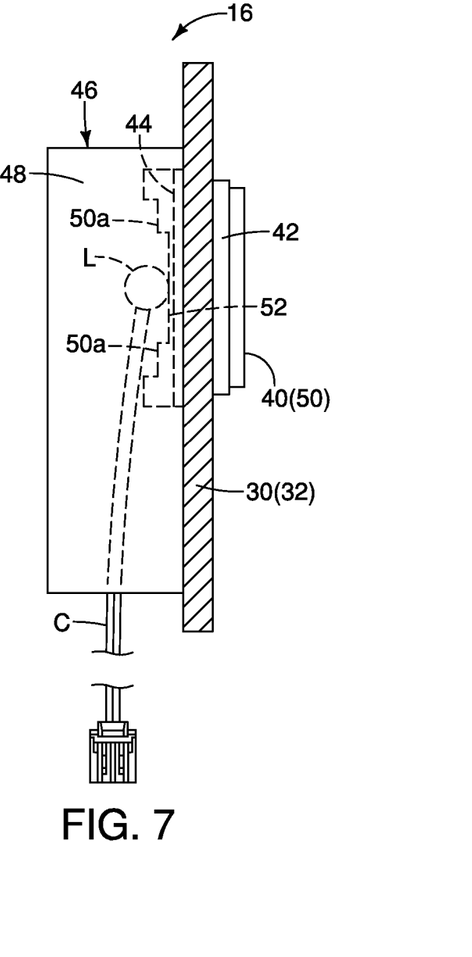
FIG. 7 is a cross-sectional side view of the lamp assembly showing the lens assembly installed to the trim panel in accordance with the first embodiment.
Figure 8:
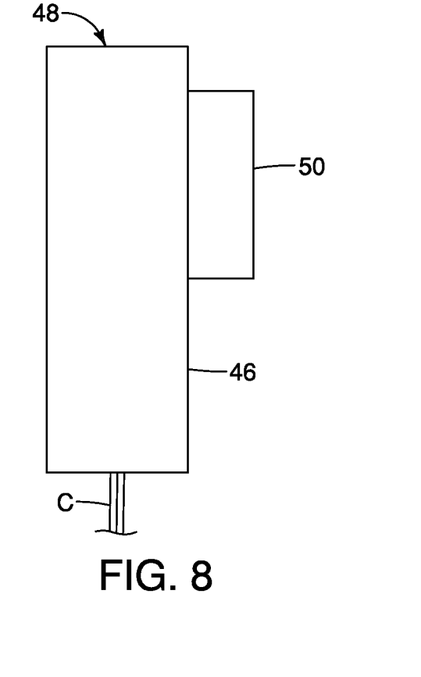
FIG. 8 is a side view of the lens assembly in accordance with the first embodiment.

As mentioned above, one end of the cable C is attached within the housing 48 to the light source L, as is shown in FIG. 7. The opposite end of the cable C attaches to a wiring harness (not shown) and to an electronic controller (not shown) of the vehicle 10. Once installed, the lens 50 is shaped and positioned to direct light from the light source L to the footwell 22 of a vehicle 10. Preferably, the lens 50 is a light diffusing lens.

The bezel 40 and the lens 50 are positioned to aim light passing through the lens 50 downward into the footwell 22 of a passenger compartment 12 of the vehicle 10.

Second Embodiment

Figure 9:
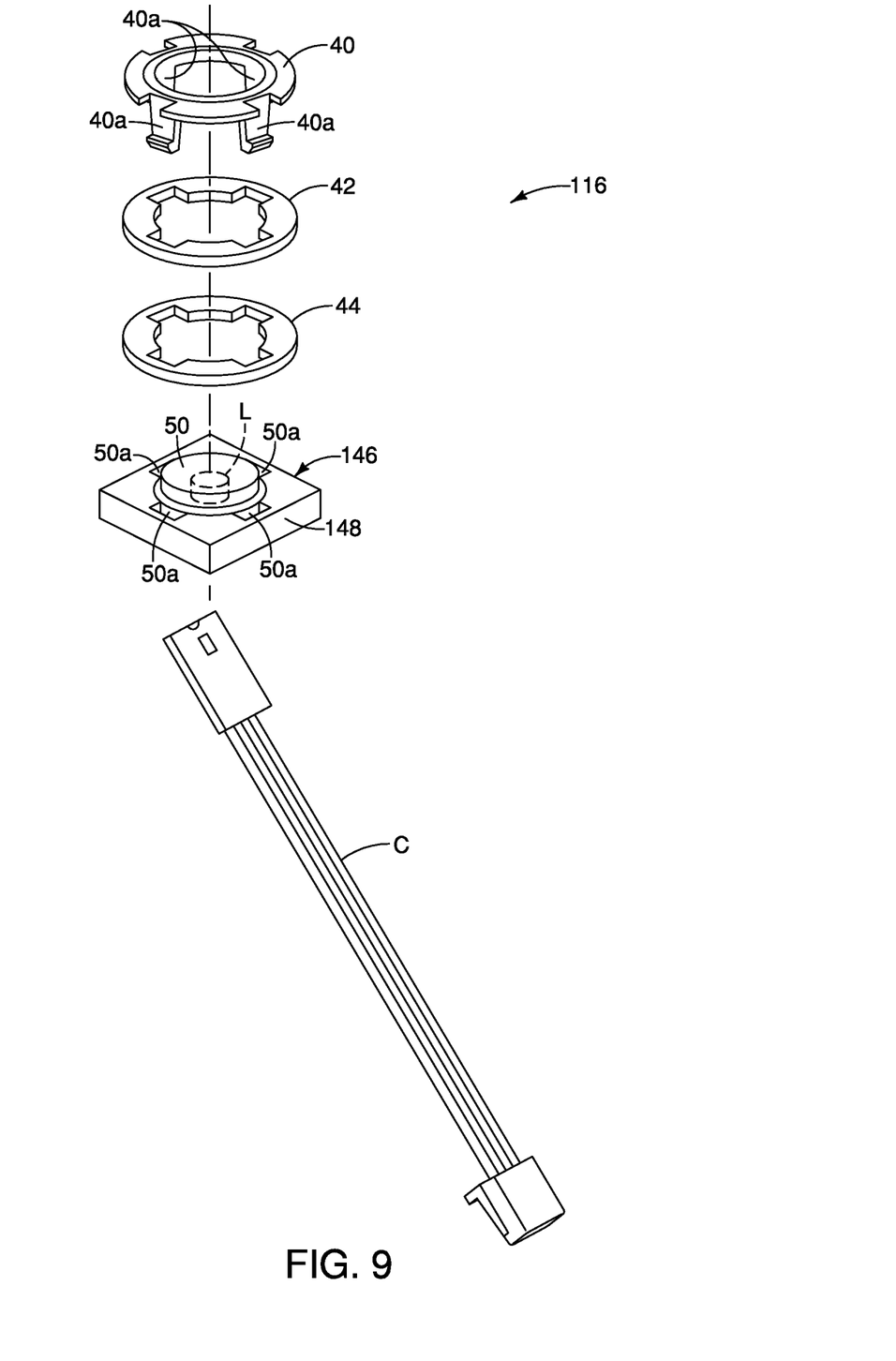
FIG. 9 is an exploded view of various elements of a lamp assembly in accordance with a second embodiment.
Figure 10:
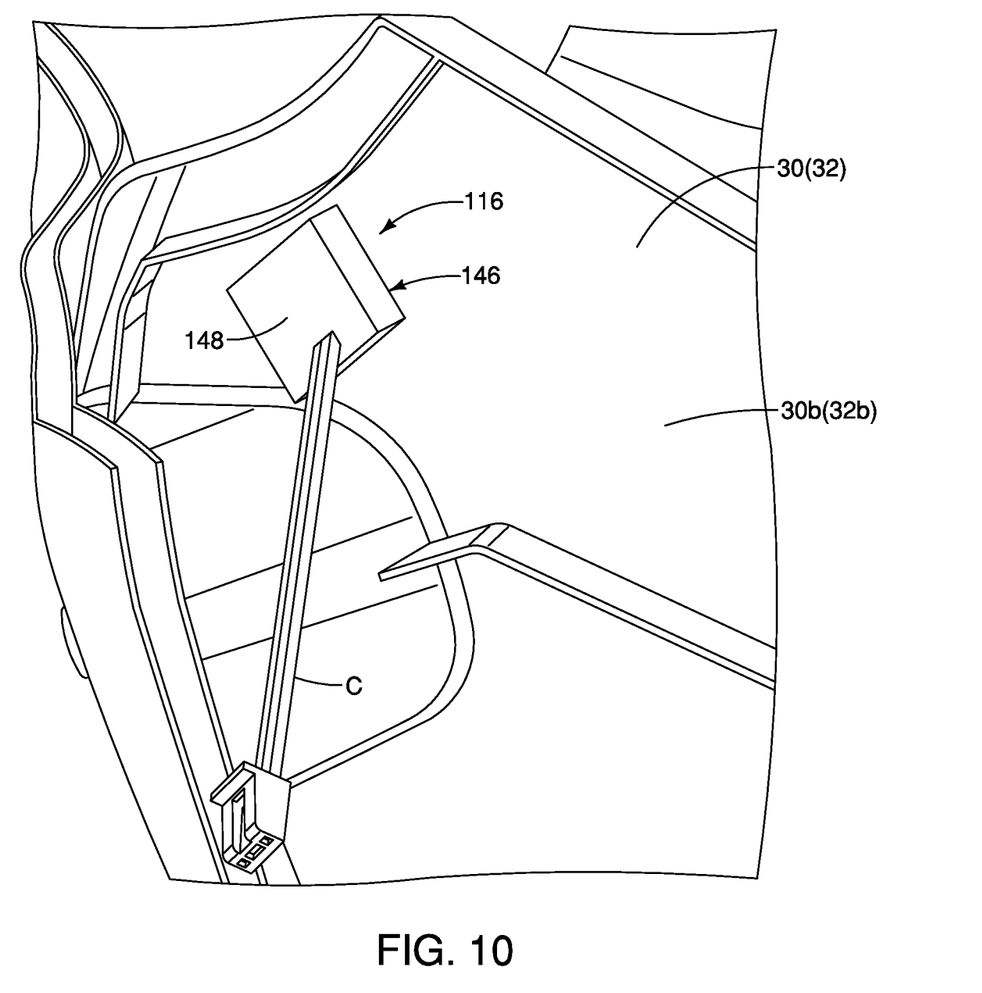
FIG. 10 is a perspective view of one of the trim panels with the lamp assembly partially installed thereto in accordance with the second embodiment.
Figure 11:
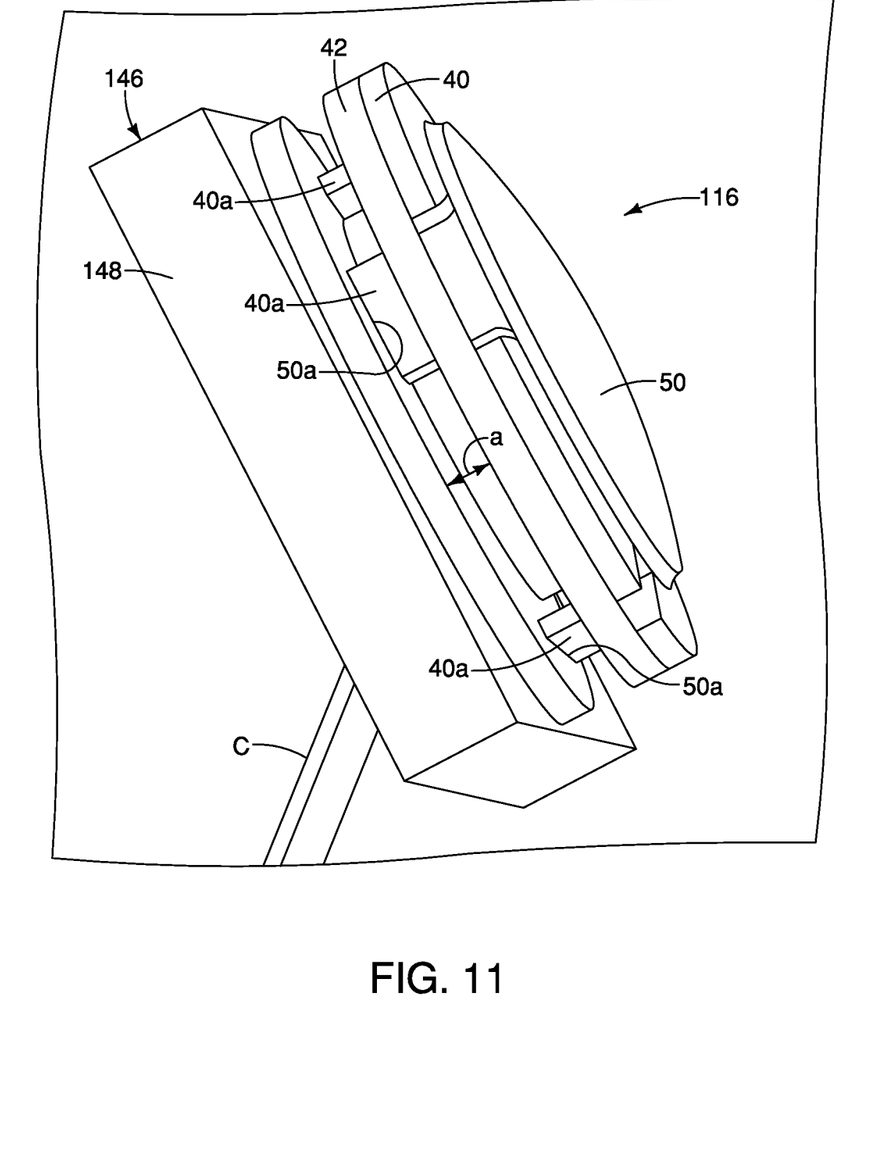
FIG. 11 is a side perspective view of the lamp assembly fully assembled with the trim panel removed in accordance with the second embodiment.

Referring now to FIGS. 9-11, a lamp assembly 116 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The lamp assembly 116 includes the bezel 40, the bezel gasket 42, the footwell gasket 44, the cable C and a lens assembly 146. The bezel 40, the bezel gasket 42, the footwell gasket 44 and the cable C are as described with respect to the first embodiment.

In the second embodiment, the lens assembly 46 of the first embodiment has been replaced with the lens assembly 146.

The lens assembly 146 includes a housing 148, the lens 50, the light source L and attachment structures 50*a*. The attachment structures 50*a* are dimensioned and located to receive the snap-fitting protrusions 40*a* of the bezel 40.

The housing 148 has a square shape and includes four of the snap-fitting protrusions 40*a*. It should be understood from the drawings and the description herein that the housing 148 can include any desired number of snap-fitting protrusions 40*a*, depending on the shaped and space constraints imposed upon the design of the housing 148. For example, there could be only two protrusions 40*a* or more that four protrusions 40*a*. As well, the housing 148 can have any of a variety of shapes in order to fit within predetermined locations within the vehicle 10. For example, the housing 148 can have an overall round, elliptical or rhomboid shape. The housing 148 includes the lens 50, the cable C, the light source L (connected to the cable C) and the housing 148.

As with the first embodiment, the bezel 40 and the lens 50 are positioned to aim light passing through the lens 50 downward into the footwell 22 of a passenger compartment 12 of the vehicle 10.

As shown in FIG. 11, a gap G is shown between the bezel gasket 42 and the footwell gasket 44. The gap G corresponding to the thickness of the trim panel 14 (not shown in FIG. 11).

The elements and structures of the passenger compartment (other than the lamp assemblies 16 and 116) are conventional components that are well known in the art. Since such elements and structures are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle lamp assembly. Accordingly, these terms, as utilized to describe the present invention should be interpreted relative to a vehicle equipped with the vehicle lamp assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle lamp assembly, comprising:
   a lamp housing that includes a lens and a light source within the lamp housing, the lens being generally cylindrical so as to define an end surface and a generally circular side surface, the light source being behind the lens, the housing having first attachment structures adjacent to the lens;
   a trim panel located adjacent to a footwell area of a passenger compartment of a vehicle, the trim panel having a first surface and a second surface opposite the first surface, the trim panel defining a first lens receiving opening that extends from the first surface to the second surface;
   a bezel having a first surface, a second surface opposite the first surface, a second lens receiving opening extending between the first and second surfaces of the bezel and second attachment structures adjacent to the second lens receiving opening such that with the lamp housing attached to the bezel the lamp housing overlays a portion of a first surface of the trim panel surrounding the first lens receiving opening, the first surface of the bezel overlays a portion of the second surface of the trim panel surrounding the second lens receiving opening, the lens of the lamp housing extends through the first lens receiving opening and the second lens receiving opening such that the end surface of the lens extends beyond the second surface of the bezel to expose the generally circular side surface of the lens and the first attachment structures and the second attachment structures are engaged with one another attaching the bezel to the lamp housing with the trim panel sandwiched therebetween with the lens being centered between the first and second attachment structures and spaced apart from the first and second attachment structures; and
   wherein the lens is disposed within the bezel to be capable of emitting through a radial side thereof.

2. The vehicle lamp assembly according to claim 1, wherein
   the lamp housing has a main body with a cylindrical protrusion extending therefrom with the lens supported by the cylindrical protrusion at a location spaced apart from the main body.

3. The vehicle lamp assembly according to claim 2, wherein
   the main body of the lamp housing has an overall rectangular shape with the cylindrical protrusion extending from the main body.

4. The vehicle lamp assembly according to claim 3, wherein
   the first attachment structures are stop surfaces and the second attachment structures are snap-fitting protrusions that contact and engage the stop surfaces with the lamp housing and the bezel attached to one another.

5. The vehicle lamp assembly according to claim 2, wherein
   the main body of the lamp housing has an overall square shape with the cylindrical protrusion extending from the main body.

6. The vehicle lamp assembly according to claim 5, wherein
   the first attachment structures are stop surfaces and the second attachment structures are snap-fitting protrusions that contact and engage the stop surfaces with the lamp housing and the bezel attached to one another.

7. The vehicle lamp assembly according to claim 1, wherein
   the first attachment structures are stop surfaces and the second attachment structures are snap-fitting protrusions that contact and engage the stop surfaces with the lamp housing and the bezel attached to one another.

8. The vehicle lamp assembly according to claim 1, wherein
   the lens is a light diffusing lens.

9. The vehicle lamp assembly according to claim 1, wherein
   the lens is positioned on the trim panel to direct light to the footwell of the vehicle.

10. The vehicle lamp assembly according to claim 1, wherein
    the trim panel is positioned adjacent to a dashwall of the passenger compartment.

11. The vehicle lamp assembly according to claim 10, wherein
the trim panel is positioned to cover a forward portion of a center console within the footwell of the passenger compartment.

12. The vehicle lamp assembly according to claim 10, wherein
the trim panel is positioned to cover a lower end of an A-pillar within the footwell of the vehicle.

13. The vehicle lamp assembly according to claim 1, wherein
the bezel includes an opaque cover that at least partially covers the lens.

14. The vehicle lamp assembly according to claim 1, wherein
the bezel has an overall circular shape.

15. The vehicle lamp assembly according to claim 1, wherein
the bezel and the lens are positioned such that light passing through the lens lights the footwell of the passenger compartment within the vehicle.

* * * * *